(12) United States Patent
Yakulis et al.

(10) Patent No.: US 8,822,594 B2
(45) Date of Patent: Sep. 2, 2014

(54) LOW TEMPERATURE APPLICATION COATING COMPOSITION COMPRISING POLYUREA AND A PHOSPHORUS-CONTAINING POLYOL AND FOOTWEAR COMPRISING POLYUREA

(75) Inventors: George Yakulis, Allison Park, PA (US); Calum H. Munro, Wexford, PA (US); Edward R. Millero, Jr., Gibsonia, PA (US); John Furar, Pittsburgh, PA (US); Barry A. Russell, Lower Burrell, PA (US); Howard L. Senkfor, South Euclid, OH (US); Debra L. Singer, Wexford, PA (US); Steven V. Barancyk, Wexford, PA (US); Thomas R. Hockswender, Gibsonia, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 1070 days.

(21) Appl. No.: 12/426,411

(22) Filed: Apr. 20, 2009

(65) Prior Publication Data

US 2010/0076143 A1 Mar. 25, 2010

Related U.S. Application Data

(60) Provisional application No. 61/099,752, filed on Sep. 24, 2008, provisional application No. 61/046,515, filed on Apr. 21, 2008.

(51) Int. Cl.
| | |
|---|---|
| C08G 18/08 | (2006.01) |
| C08L 75/00 | (2006.01) |
| C08G 18/28 | (2006.01) |
| C08G 18/22 | (2006.01) |
| C08G 18/00 | (2006.01) |
| C08G 18/18 | (2006.01) |
| C08G 18/10 | (2006.01) |
| C08G 18/32 | (2006.01) |
| C08G 79/02 | (2006.01) |
| C08G 18/38 | (2006.01) |
| C08G 18/78 | (2006.01) |
| C08G 18/66 | (2006.01) |
| C08L 75/02 | (2006.01) |
| C08G 18/50 | (2006.01) |

(52) U.S. Cl.
CPC ........ *C08G 18/7837* (2013.01); *C08G 18/3234* (2013.01); *C08G 2410/00* (2013.01); *C08G 18/3821* (2013.01); *C08G 18/6685* (2013.01); *C08L 75/02* (2013.01); *C08G 18/5024* (2013.01); *C08G 18/3885* (2013.01)
USPC .............. 524/589; 524/590; 528/51; 528/52; 528/53; 528/61; 528/398

(58) Field of Classification Search
USPC .................................. 528/51, 52, 53, 61, 398
See application file for complete search history.

(56) References Cited

U.S. PATENT DOCUMENTS

| | | | | |
|---|---|---|---|---|
| 3,597,509 A | * | 8/1971 | Praetzel et al. | 558/105 |
| 3,795,636 A | * | 3/1974 | Huffman et al. | 521/51 |
| 4,826,721 A | * | 5/1989 | Obrecht et al. | 442/71 |
| 4,885,348 A | * | 12/1989 | Brown et al. | 525/458 |
| 4,920,167 A | * | 4/1990 | Ruetman et al. | 524/155 |
| 5,236,741 A | | 8/1993 | Zwiener et al. | |
| 5,269,995 A | * | 12/1993 | Ramanathan et al. | 264/173.12 |
| 6,013,755 A | | 1/2000 | Primeaux, II et al. | |
| 6,403,752 B1 | | 6/2002 | House et al. | |
| 6,613,389 B2 | | 9/2003 | Li et al. | |
| 6,630,565 B1 | | 10/2003 | Van Den Bergen et al. | |
| 7,611,772 B2 | | 11/2009 | Barancyk et al. | |
| 7,658,967 B2 | | 2/2010 | DiMario | |
| 2002/0187289 A1 | * | 12/2002 | Chang et al. | 428/35.2 |
| 2003/0047836 A1 | | 3/2003 | Rickner et al. | |
| 2003/0105220 A1 | | 6/2003 | Gupta et al. | |
| 2003/0118739 A1 | | 6/2003 | Li et al. | |
| 2004/0068036 A1 | * | 4/2004 | Halladay et al. | 524/439 |
| 2004/0225028 A1 | * | 11/2004 | Ohrbom et al. | 522/114 |
| 2006/0046068 A1 | | 3/2006 | Barancyk et al. | |
| 2007/0048504 A1 | | 3/2007 | DiMario | |
| 2007/0071904 A1 | | 3/2007 | Yabe et al. | |
| 2007/0160851 A1 | | 7/2007 | Barancyk et al. | |
| 2007/0160853 A1 | | 7/2007 | Martz et al. | |

FOREIGN PATENT DOCUMENTS

| | | | | |
|---|---|---|---|---|
| EP | 0287192 A2 | 10/1988 | | |
| EP | 0517466 A2 | 12/1992 | | |
| SU | 560892 | * | 8/1975 | ............. C08G 18/10 |
| WO | 02/28935 | 4/2002 | | |
| WO | 02/102869 | 12/2002 | | |

OTHER PUBLICATIONS

Degussa Dynasylan (R) Ameo pp. 1-2 {http://2.imimg.com/data2/RI/IU/MY-2906900/3-aminopropyltrimethoxysilane.pdf} Jul. 2003.*
U.S. Appl. No. 11/460,439, filed Jul. 27, 2006, Senkfor et al.
U.S. Appl. No. 11/611,982, filed Dec. 18, 2006, Barancyk et al.
U.S. Appl. No. 12/122,972, filed May 19, 2008, Furar et al.
U.S. Appl. No. 12/122,980, filed May 19, 2008, Barancyk et al.
U.S. Appl. No. 12/122,983, filed May 19, 2008, Zalich et al.
U.S. Appl. No. 12/759,106, filed Apr. 13, 2010, Barancyk et al.

* cited by examiner

*Primary Examiner* — Patrick Ryan
*Assistant Examiner* — Aaron Greso
(74) *Attorney, Agent, or Firm* — Alicia M. Passerin

(57) ABSTRACT

Coating compositions comprising a polyurea formed from a reaction mixture comprising: (a) a first component comprising an isocyanate, the first component having a viscosity of ≤2000 centipoise at a temperature ≥7° C.; and (b) a second component comprising an amine. Substrates coated at least in part with such a composition are also disclosed. Footwear coated at least in part with polyurea are also disclosed.

17 Claims, No Drawings

LOW TEMPERATURE APPLICATION COATING COMPOSITION COMPRISING POLYUREA AND A PHOSPHORUS-CONTAINING POLYOL AND FOOTWEAR COMPRISING POLYUREA

CROSS-REFERENCE TO RELATED APPLICATIONS

This patent application claims the benefit of United States Provisional Patent Application Ser. No. 61/099,752 filed Sep. 24, 2008, entitled: "LOW TEMPERATURE APPLICATION COATING COMPOSITION COMPRISING POLYUREA AND A PHOSPHORUS-CONTAINING POLYOL" and United States Provisional Patent Application Ser. No. 61/046,515 filed Apr. 21, 2008, entitled: "FOOTWEAR COMPRISING POLYUREA".

This invention was made with Government support under Contract No. 200-2007-20426 awarded by the Centers for Disease Control and Prevention. The United States Government may have certain rights in this invention.

FIELD OF THE INVENTION

The present invention is directed to a coating composition comprising a polyurea, and to footwear comprising a polyurea.

BACKGROUND

Coating compositions are used in a wide variety of industries. Such industries may include but are not limited to landcraft such as cars, trucks, sport utility vehicles, motorcycles; watercraft such as boats, ships and submarines; aircraft such as airplanes and helicopters, industrial such as commercial equipment and structures including walls and roofs; construction such as construction vehicles and structures including walls and roofs, military such as military vehicles, for example tanks and humvees, and military structures including walls and roofs, for example, ammunition cases and battery enclosures; and the like.

In these industries, coatings serve a variety of purposes such as protecting various components against damage due to corrosion, abrasion, impact, chemicals, ultraviolet light, flame and heat, and other environmental exposure as well imparting ballistic and blast mitigation properties to the components onto which they are deposited. Accordingly, considerable efforts have been expended to develop coating compositions with improved properties.

Coatings can often be used in the footwear industry. Footwear is generally divided into two parts, an upper and a sole. The upper is the portion of the footwear designed to comfortably enclose the foot, while the sole is the portion of the footwear designed to provide traction, protection, cushioning, and/or a durable wear surface.

The upper is typically comprised of many different components, often made of different materials. Such materials include, for example, natural leather, synthetic leather, vinyl, and fabric such as nylon; other textiles may also be used. Many of the upper components, particularly the "toe", can experience wear and/or abrasion during even normal use of the shoe.

Similarly, the sole often includes different components made of different materials. Midsoles are typically made of foam, such as ethylene vinyl acetate (EVA) foam or polyurethane, such as TPU, foam. These materials compress resiliently under an applied load, such as the forces generated by the feet and legs during physical activity. Many shoes, particularly athletic shoes, include filled cushioning devices or bladders within another shoe component, such as a midsole, outsole and the like. The bladders can be inflatable inserts made of polymeric materials that are resistantly compressible to provide additional cushioning to the wearer of the footwear. These bladders can be filled, for example, with plasma, water or other fluid, such as air or nitrogen. Outsoles are often made of synthetic and/or natural rubbers, such as silica-filled rubber compositions. The outsole can also experience wear and/or abrasion during even normal use of a shoe.

Improved resistance and/or durability of shoe components to wear, abrasion, and other damage is therefore desired.

SUMMARY OF THE INVENTION

The present invention is directed to a coating composition comprising a polyurea formed from a reaction mixture comprising: (a) a first component comprising an isocyanate, the first component having a viscosity of ≤2000 centipoise (cPs) at a temperature ≥7° C.; and (b) a second component comprising an amine, the second component having a viscosity of ≤1700 cPs at a temperature of ≥7° C. The present invention is also directed to a method for coating a substrate with such a coating.

The present invention is further directed to footwear comprising a component that is coated at least in part with a composition comprising a polyurea.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges contained therein. Plural encompasses singular and vice versa. "Including" and like terms are open ended; that is, they mean "including but not limited to". For example, while the invention has been described herein including the claims in terms of "a" polyurea, "a" polyurethane, "an" isocyanate, "an" amine, "a" polyol, "a" polythiol, "a" prepolymer, "a" catalyst, and the like, mixtures of all of such things can be used. Also, as used herein, the term "polymer" is meant to refer to prepolymers, oligomers and both homopolymers and copolymers; the prefix "poly" refers to two or more.

As used herein, the term "cure" refers to a coating wherein any crosslinkable components of the composition are at least partially crosslinked. In certain embodiments, the crosslink density of the crosslinkable components (i.e., the degree of crosslinking) ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

Viscosity measurements used herein were measured using a PHYSICA MCR 301 rheometer (commercially available from Antone Paar GmbH, Austria) having a 50 mm/1° cone plate. The sample that is to be measured is loaded onto the cone plate at 23.89° C. and viscosity measurements are taken at a constant shear rate of 1000 s$^{-1}$ at the appropriate temperatures.

As used herein, the tensile strength and/or % elongation of a coating composition, after it has been applied onto a substrate and cured, was tested pursuant to the ASTM D638-08 standard.

Reference to any monomer(s) herein refers generally to a monomer that can be polymerized with another polymerizable compound such as another monomer or polymer. Unless otherwise indicated, it should be appreciated that once the monomer components react with one another to form the compound, the compound will comprise the residues of the monomer components.

Coating Composition

The present invention is directed to a coating composition comprising polyurea formed from a reaction mixture comprising a first component (sometimes referred to herein as the "isocyanate component"), which comprises an isocyanate, and a second component (sometimes referred to herein as the "amine component"), which comprises an amine. The first component has a viscosity of ≤2000 cPs at a temperature of ≥7° C. and the second component has a viscosity of ≤1700 cPs at a temperature of ≥7° C. In certain embodiments, the coating composition can further comprise a polyurethane.

In some embodiments, the coating composition, after application to a substrate and after curing, demonstrates a % elongation of ≥10. For example, in some embodiments, the % elongation can be ≥100, such as 200. In some embodiments, the coating composition, after application to a substrate and after curing, demonstrates a maximum tensile strength of ≥5 MPa, such as 10 MPa.

Isocyanate Component

As noted above, at a temperature ≥7° C., such as a temperature ranging from 7° C. to 13° C., the viscosity of the first component is ≤2000 centipoise (cP). In certain embodiments the viscosity is ≤1800, or ≤1500. In some embodiments, the viscosity of the first component ranges from 1100 centipoise to 1600 centipoise at a temperature ranging from 13° C. to 10° C.

As used herein, the term "isocyanate" includes unblocked isocyanate compounds capable of forming a covalent bond with a reactive group such as a hydroxyl, thiol or amine functional group. Thus, isocyanate can refer to "free isocyanate", which will be understood to those skilled in the art. In certain embodiments, the isocyanate of the present invention can be monofunctional (containing one isocyanate functional group (NCO)) or the isocyanate used in the present invention can be polyfunctional (containing two or more isocyanate functional groups (NCOs)). The isocyanate can also be blocked. Combinations of any isocyanates and/or isocyanate functional prepolymers can be used according to the present invention.

Suitable isocyanates for use in the present invention are numerous and can vary widely. Such isocyanates can include those that are known in the art. Non-limiting examples of suitable isocyanates can include monomeric and/or polymeric isocyanates. The isocyanates can be selected from monomers, prepolymers, oligomers, or blends thereof. In an embodiment, the isocyanate can be $C_2$-$C_{20}$ linear, branched, cyclic, aromatic, aliphatic, or combinations thereof.

Suitable isocyanates for use in the present invention may include but are not limited to isophorone diisocyanate (IPDI), which is 3,3,5-trimethyl-5-isocyanato-methyl-cyclohexyl isocyanate; hydrogenated materials such as cyclohexylene diisocyanate, 4,4'-methylenedicyclohexyl diisocyanate ($H_{12}$MDI); mixed aralkyl diisocyanates such as tetramethylxylyl diisocyanates, OCN—C(CH$_3$)$_2$—C$_6$H$_4$C(CH$_3$)$_2$—NCO; polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate; and mixtures thereof.

Non-limiting examples of aromatic isocyanates for use in the present invention may include but are not limited to phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate, alkylated benzene diisocyanates, methylene-interrupted aromatic diisocyanates such as methylenediphenyl diisocyanate, 4,4'-isomer (MDI) including alkylated analogs such as 3,3'-dimethyl-4,4'-diphenylmethane diisocyanate, polymeric methylenediphenyl diisocyanate; and mixtures thereof.

In certain embodiments, isocyanate monomer may be used. It is believed that the use of an isocyanate monomer (i.e., residual-free monomer from the preparation of prepolymer) may decrease the viscosity of the polyurea composition thereby improving its flowability, and may provide improved adhesion of the polyurea coating to a previously applied coating and/or to an uncoated substrate. In alternate embodiments of the present invention, at least 1 percent by weight, or at least 2 percent by weight, or at least 4 percent by weight of the isocyanate component comprises at least one isocyanate monomer.

In certain embodiments of the present invention, the isocyanate can include oligomeric isocyanate such as but not limited to dimers such as the uretdione of 1,6-hexamethylene diisocyanate, trimers such as the biuret and isocyanurate of 1,6-hexanediisocyanate and the isocyanurate of isophorone diisocyanate, allophonates and polymeric oligomers. Modified isocyanates can also be used, including but not limited to carbodiimides and uretone-imines, and mixtures thereof. Suitable materials include, without limitation, those available under the designation DESMODUR from Bayer Corporation of Pittsburgh, Pa. and include DESMODUR N 3200, DESMODUR N 3300, DESMODUR N 3400, DESMODUR XP 2410 and DESMODUR XP 2580.

In some embodiments, the isocyanate component comprises an isocyanate functional prepolymer formed from a reaction mixture comprising an isocyanate and another material. Any isocyanate known in the art, such as any of those described above, can be used in the formation of the prepolymer. As used herein, an "isocyanate functional prepolymer" refers to the reaction product of isocyanate with polyamine and/or other isocyanate reactive group such as polyol; the isocyanate functional prepolymer has at least one isocyanate functional group (NCO).

In certain embodiments of the present invention, an isocyanate functional prepolymer comprises isocyanate that is pre-reacted with a material comprising a flame retardant material, such as a phosphorus-containing polyol. Suitable isocyanate functional prepolymers comprising a flame retardant material are disclosed in Paragraphs [0017]-[0023] of U.S. Ser. No. 12/122,980, incorporated by reference herein. As described in that excerpt, in certain embodiments the phosphorus containing polyol can itself be the reaction product of a phosphorus containing polyol, sometimes referred to as an "initial" phosphorus containing polyol, and another compound.

In some embodiments, however, the polyol used in the formation of the pre-polymer is not a phosphorus containing polyol. Suitable non-phosphorous containing polyols include polytetrahydrofuran materials such as those sold under the tradename TERATHANE (e.g., TERATHANE 250, TERATHANE 650, TERETHANE 1000 available from Invista Corporation).

A polyurea coating composition, which can exhibit improved flame and/or heat resistance, can comprise any phosphorus-containing isocyanate prepolymer. As used herein, the term "flame retardant", "flame resistant", "heat retardant", "heat resistant" and the like refers to the ability to withstand flame or heat without igniting. As used herein, the terms "improved flame resistance" and "improved heat resistance" means any degree of improved flame resistance or heat resistance, respectively, that is demonstrated by a coating composition with flame retardant material as compared to a coating composition, such as the same coating composition, without flame retardant material.

In certain embodiments, the isocyanate component comprises an isocyanate (non-prepolymer isocyanate) and an isocyanate functional prepolymer. The non-prepolymer isocyanate can be the same or different from the isocyanate used to form the isocyanate functional prepolymer. If combinations of isocyanates are used, the isocyanates should be substantially compatible, for example; the isocyanate functional prepolymers can be substantially compatible with the non-prepolymer isocyanate. As used herein, "substantially compatible" means the ability of a material to form a blend with other materials that is and will remain substantially homogeneous over time. The reaction of an isocyanate with an organic material, such as in the formation of an isocyanate functional prepolymer, helps to compatibilize the isocyanate.

Amine Component

The amine component comprises a suitable amine. At a temperature ≥7° C., such as a temperature ranging from 7° C. to 13° C., the viscosity of the second component is ≤1700 centipoise, such as ≤1500 centipoise or ≤1000 centipoise. The amine component may be referred to herein as a "curative" because it will react or cure with the isocyanate to form a polyurea. In certain embodiments, the ratio of equivalents of isocyanate groups to equivalents of amine groups is greater than 1 and the isocyanate component and the amine component can be applied to a substrate at a volume mixing ratio of 1:1.

Suitable polyamines are numerous and can vary widely. Such polyamines can include those that are known in the art. Non-limiting examples of suitable polyamines can include but are not limited to primary and secondary amines, and mixtures thereof, such as any of those listed herein. Amine terminated polyureas may also be used. Amines comprising tertiary amine functionality can be used provided that the amine further comprises at least two primary and/or secondary amino groups. In certain embodiments, wherein the isocyanate functional prepolymer comprises a polyamine, the ratio of equivalents of isocyanate groups (NCOs) to equivalents of amine groups (NHs) can be greater than 1.

In certain embodiments, the amine may include, for example, monoamines, or polyamines having at least two functional groups such as di-, tri-, or higher functional amines; and mixtures thereof. In further embodiments, the amine may be aromatic or aliphatic such as cycloaliphatic, or mixtures thereof. Non-limiting examples of suitable monoamines can include aliphatic polyamines such as, but not limited to, ethylamine, isomeric propylamines, butylamines, pentylamines, hexylamines, cyclohexylamine, and benzylamine. Suitable primary polyamines include, but are not limited to, ethylene diamine, 1,2-diaminopropane, 1,4-diaminobutane, 1,3-diaminopentane (DYTEK EP, Invista), 1,6-diaminohexane, 2-methyl-1,5-pentane diamine (DYTEK A, Invista), 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluoylene diamine, 2,4'-diaminodicyclohexyl methane, 4,4'-diaminodicyclohexyl methane (PACM-20, Air Products) and 3,3'-dialkyl-4,4'-diaminodicyclohexyl methanes (such as 3,3'-dimethyl-4,4'-diaminodicyclohexyl methane (DIMETHYL DICYKAN or LAROMIN C260, BASF; ANCAMINE 2049, Air Products) and 3,3'-diethyl-4,4'-diaminodicyclohexyl methane), 2,4- and/or 2,6-diaminotoluene, 3,5-diethyltoluene-2,4-diamine, 3,5-diethyltoluene-2,6-diamine, 3,5-dimethylthio-2,4-toluenediamine, 3,5-dimethylthio-2,4-toluenediamine, 2,4'- and/or 4,4'-diaminodiphenyl methane, dipropylene triamine, bis hexamethylene triamine, or combinations thereof. Polyoxyalkyleneamines are also suitable. Polyoxyalkyleneamines comprise two of more primary or secondary amino groups attached to a backbone, derived, for example, from propylene oxide, ethylene oxide, butylene oxide or a mixture thereof. Examples of such amines include those available under the designation JEFFAMINE, such as, without limitation, JEFFAMINE D-230, D-400, D-2000, HK-511, ED-600, ED-900, ED-2003, T-403, T-3000, T-5000, SD-231, SD-401, SD-2001, and ST-404 (Huntsman Corporation). Such amines have an approximate molecular weight ranging from 200 to 7500.

Secondary cycloaliphatic diamines may also be used in the present invention. Suitable cycloaliphatic diamines include, without limitation, JEFFLINK 754 (Huntsman Corporation), CLEARLINK 1000 (Dorf-Ketal Chemicals, LLC), and aspartic ester functional amines, such as those available under the name DESMOPHEN such as DESMOPHEN NH1220, DESMOPHEN NH 1420, and DESMOPHEN NH 1520 (Bayer Materials Science LLC.). Other suitable secondary amines that can be used in the present invention include the reaction products of materials comprising primary amine functionality, such as those described herein, with acrylonitrile. For example, the secondary amine can be the reaction product of 4,4'-diaminodicyclohexylmethane and acrylonitrile. Alternatively, the secondary amine can be the reaction product of isophorone diamine and acrylonitrile, such as POLYCLEAR 136 (available from BASF/Hansen Group LLC).

Other amines that can be used in the present invention include adducts of primary polyamines with mono or polyepoxies such as the reaction product of isophorone diamine with CARDURA E-10P.

The present polyurea compositions may also comprise one or more amines such as those describe in U.S. patent application Ser. Nos. 11/611,979, 11/611,984, 11/611,988, 11/611,982, and 11/611,986, all of which are incorporated in pertinent part herein by reference.

Additional Ingredients

In certain embodiments, the coating composition may comprise one or more additional ingredients in the first (iso) and/or second (amine) component. Similarly, the coating may comprise one or more additional components that are mixed with the first and second components prior to use. Additional ingredients may include, for example, a flame retardant material in addition to or instead of an isocyanate functional prepolymer comprising a flame retardant material as described herein. The additional flame retardant material can be added to the isocyanate and/or the amine component of the present invention.

Any flame retardant material known in the art can be used as the additional flame retardant material in the present invention. Such flame retardants can include, for example, those described in Paragraphs [0035] and [0038] of U.S. patent application Ser. No. 12/122,980, which paragraphs are incorporated by reference herein. Other suitable flame retardant materials include, without limitation, the flame retardant polymers disclosed in U.S. Pat. Nos. 6,015,510 (column 4, line 31 thru column 5, line 41, which excerpts are incorporated by reference herein) and 5,998,503 (column 4, line 31 thru column 5, line 41, which excerpts are incorporated by reference herein), halogenated phosphates or halogen free phosphates, powdered or fumed silica, layered silicates, aluminum hydroxide, brominated fire retardants, tris(2-chloropropyl) phosphate, tris(2,3-dibromopropyl)phosphate, tris(1,3-dichloropropyl)phosphate, diammonium phosphate, various halogenated aromatic compounds, antimony oxide, alumina trihydrate, polyvinyl chloride and the like, and mixtures thereof. In certain embodiments, the flame retardant material is tris(2-chloropropyl) phosphate, which is available from Supresta under the designation FYROL PCF. When the flame retardant is a low viscosity liquid, it also can reduce the viscosity of the isocyanate and/or amine component, enhancing sprayability. In certain embodiments, the flame retardant material may include a phosphinic salt and/or diphosphinic salt, such as those described in United States Patent Publication Nos. 2005/0004277A1 and 2005/0004278A1, from Paragraph [0025] to Paragraph [0070] in both publications, which paragraphs are incorporated by reference herein.

In some embodiments, anti-oxidants, hindered amine light stabilizing compounds, or combinations thereof may be used in the present invention as a flame retardant. Suitable anti-oxidants that may be used in the present invention include phenolic and/or phosphorus based anti-oxidants. Suitable examples of such anti-oxidants are disclosed in Table 1 of U.S. Pat. Pub. No. 2007/0203269, which Table is incorporated by reference in its entirety herein, ANNOX IC-14 (available from Chemtura Corp). Suitable hinder amine light stabilizing compounds that may be used in the present invention include polymeric hinder amine light stabilizing compounds, monomeric hindered amine light stabilizing compounds, or combinations thereof. Suitable polymeric hindered amine light stabilizing compounds include TINUVIN 266, CHIMASORB 199FL, CHIMASORB 944 FDL, TINUVIN 622 (all of which are available from Ciba), CYASORB UV3529, CYASORB UV 3346 (both of which are available from Cytec Industries), polymers with hindered amine light stabilizing functionality, or combinations thereof. Suitable monomeric hinder amine light stabilizing compounds that may be used in the present invention include CYASORB UV3853 (available from Cytec).

The amount of the flame retardant material used can vary widely depending on the needs of the user. In certain embodiments, the flame retardant in the additional flame retardant material and the isocyanate functional pre-polymer can comprise up to 35 percent by weight based on the total weight of reactants in the coating composition.

The coatings used according the present invention can further comprise any additional resins and/or additives that will impart to the coating a desired property. For example, in certain embodiments the polyurea coating may comprise a resin and/or additive that imparts additional flexibility to a coating. In certain embodiments, such resin can be a polyurethane resin. Flexible polyurethane resins are known in the art, and are also described, for example, in U.S. patent application Ser. Nos. 11/155,154; 11/021,325; 11/020,921; 12/056,306 and 12/056,304, incorporated in pertinent part herein by reference. The polyurethane itself can be added to the composition comprising polyurea, or the polyurethane can be formed in situ the polyurea composition. It will be appreciated that polyurethane can be formed by reacting a hydroxyl functional component with an isocyanate, much in the same manner as the amine and isocyanate components described herein react. Thus, a hydroxyl functional component can be mixed with, or used in addition to, the amine component for in situ polyurethane formation.

Additional compositions comprising polyurea that would be suitable for use in the present invention include those described in U.S. patent application Ser. Nos. 11/211,188; 11/460,439; 11/591,312; 11/611,979; 11/611,982; 11/611,984; 11/744,259 and 11/773,051, incorporated by reference in their entirety herein.

The polyurea coating compositions of the present invention may optionally include materials standard in the art such as but not limited to fillers, fiberglass, stabilizers, thickeners, adhesion promoters, catalysts, colorants, antioxidants, UV absorbers, hindered amine light stabilizers, rheology modifiers, flow additives, anti-static agents and other performance or property modifiers that are well known in the art of surface coatings, and mixtures thereof. Suitable rheology modifiers include solid and/or liquid rheology modifiers, which can be organic and/or inorganic based polymers, such as bentonite clay, fumed silica, BYK 411 (available from Chemie), or combinations thereof. Fillers can include clay and/or silica, and adhesion promoters can include amine functional materials, aminosilanes and the like; examples of fillers and adhesion promoters are further described in U.S. Publication No. 2006/0046068 and U.S. application Ser. No. 11/591,312, hereby incorporated by reference in their entirety. In alternate embodiments, such materials may be combined with the isocyanate component, the amine component, or both. In a further embodiment, at least one of these materials is added to the amine prior to reaction with isocyanate. In certain embodiments, the coating may further comprise small amounts of solvent and in certain embodiments the coating may be substantially solvent-free. "Substantially solvent-free" means that the coating may contain a small amount of solvent, such as 5%, 2%, 1% or less.

In another embodiment, the coating composition of the present invention may include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP-PBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In an embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

In another embodiment, the coating compositions of the present invention when applied to a substrate possesses color that matches the color of an associated substrate. As used herein, the term "matches" and like terms when referring to color matching means that the color of the coating composition of the present invention substantially corresponds to a desired color or the color of an associated substrate. This can be visually observed, or confirmed using spectroscopy equipment. For instance, when the substrate for the polyurea coating composition is a footwear component, such as a polymeric bladder or upper component, the color of the coating substantially matches that of another footwear component. For example, a toe coated according to the present invention can be color matched to the rest of the shoe upper, the midsole and/or the outsole. This match can be visually observed, or confirmed using spectroscopy equipment.

Coating Layer System

The coatings of the present invention may be part of a multi-layer coating composite comprising a substrate with various coating layers applied thereto, such as a pretreatment layer, electrocoat, primer, base coat and/or clear coat. At least one of the base coat and clear coat may contain colorant and/or the clear coat may contain an adhesion promoter. It is believed that the addition of adhesion promoter to the clear coat may improve the adhesion between the clear coat and the coating composition applied thereover, although the inventors do not wish to be bound by any mechanism. In this embodiment, the coating composition of the present invention may be the reaction product of isocyanate and amine with a colorant additive. The coating composition of the present invention containing colorant may be applied to at least a portion of the article or structure. The color of the coated article or structure may match the color of an associated substrate. An "associated substrate" may refer to a substrate within an article or structure that is not coated with the coating composition of the present invention; a substrate that is attached, connected or in close proximity to the article or structure being, but not coated with the coating composition of the present invention, can also be an "associated substrate".

Accordingly, the present invention is further directed to methods for coating a substrate comprising applying to at least a portion of the substrate any of the coating compositions described herein. The coating compositions of the present invention may be formulated and applied using various techniques known in the art. In an embodiment, conventional spraying techniques may be used. In this embodiment, the isocyanate and amine may be combined such that the ratio of equivalents of isocyanate groups to equivalents of amine groups is greater than 1 and the isocyanate and amine can be applied to a substrate at a volume mixing ratio of 1:1; the reaction mixture may be applied to an uncoated or coated substrate to form a first coating on the uncoated substrate or a subsequent coating on the coated substrate. When determining the ratio of equivalents of isocyanate groups to equivalents of reactive amine groups, the total amine reactive groups are taken into consideration; that is the amine groups from any amine or amines used in the coating. It will be understood by those skilled in the art that hydroxyl and/or thiol groups may be included into the tally of total reactive amine groups when calculating the ratio of equivalents of isocyanate to the equivalents in the amine component. Those skilled in the art will also recognize that other mixing volume or weight ratios can be used while maintaining the net ratio of isocyanate functional groups to the sum of amine, hydroxyl, and/or thiol groups is greater than 1.

It will be appreciated that the present composition is a two component ("2K") composition. Accordingly, the isocyanate component and the amine component are kept separate until just prior to application. It will be understood that the composition can be cured at ambient conditions, although heated air or a heat cure can be applied to the coating composition in order to accelerate curing of the coating composition or to enhance coating properties such as adhesion. Additional components comprising other ingredients can be used based upon the needs of the user.

In an embodiment, the sprayable coating composition may be prepared using a two-component mixing device. In this embodiment, isocyanate and amine are added to a high pressure impingement mixing device. The isocyanate is added to the "A-side" and amine is added to the "B-side". The A- and B-side streams are impinged upon each other and immediately sprayed onto at least a portion of an uncoated or coated substrate. The isocyanate and the amine react to produce a coating composition that is cured upon application to the uncoated or coated substrate. The A- and/or B-side can also be heated prior to application, such as to a temperature of ≤70° C., such as 60° C. Heating may promote a better viscosity match between the two components and thus better mixing, but is not necessary for the curing reaction to occur. Indeed, a benefit achieved by the present invention is reduced viscosity, and therefore better "sprayability" without the need to heat either or both of the components. This is particularly beneficial when the use of heat and/or pressure are not desirable, such as when coating walls in caves, mines, and other closed structures. Accordingly, the A- and/or B-side may be applied at a temperature ≤23° C., such as from 7° C. to 14° C.

In some embodiments, a "static mix tube" applicator, which is an application device known in the art, may be used with the present invention. In this device, the isocyanate and amine are each stored in a separate chamber. As pressure is applied, each of the components is brought into a mixing tube in a 1:1 ratio by volume. Mixing of the components is effected by way of a torturous or cork screw pathway within the tube. The exit end of the tube may have atomization capability useful in spray application of the reaction mixture. Alternatively, the fluid reaction mixture may be applied to a substrate as a bead. A static mix tube applicator is commercially available from Plas-Pak Industries Inc. or Cammda Corporation.

The volume mixing ratio of the isocyanate and amine may be such that the resulting isocyanate and amine reaction mixture can be applied to a substrate at a volume mixing ratio of 1:1. As used herein, "volume mixing ratio 1:1" means that the volume mixing ratio varies by up to 20% for each component, or up to 10% or up to 5%.

It is believed that the ratio of equivalents of isocyanate groups to amine groups may be selected to control the rate of cure of the coating composition of the present invention. In certain embodiments, it has been found that cure and adhesion advantages may result when the ratio of the equivalents of isocyanate groups to amine groups (also known as the reaction index) is greater than one, such as from 1.01 to 1.10:1, or from 1.03 to 1.10:1, or from 1.05 to 1.08:1 or from 1.01 to 1.4 to 1 or from 1.01 to 1.5, or 1.3 or greater to 1. For example, good adhesion can be obtained using these ratios over clearcoats that have low surface functionality after cure, such as carbamate melamine, hydroxyl melamine, 2K urethane, and silane-containing clearcoats. The term "1:1 volume ratio" means that the volume ratio varies by up to 20% for each component, or up to 10% or up to 5%.

In a non-limiting embodiment, a commercially available mixing device can be used such as those described in Paragraphs [0037] and [0038] of United States Patent Publication Number 2007/0160851, which is incorporated by reference herein.

The coating composition of the present invention may be applied to a wide variety of substrates. Non-limiting examples of suitable substrates can include, but are not limited to, metal, natural and/or synthetic stone, ceramic, glass, brick, cement, concrete, cinderblock, wood and composites and laminates thereof; wallboard, drywall, sheetrock, cement board, plastic, paper, PVC, roofing materials such as shingles, roofing composites and laminates, and roofing drywall, styrofoam, plastic composites, acrylic composites, ballistic composites, asphalt, fiberglass, soil, gravel and the like. Metals can include but are not limited to aluminum, cold rolled steel, electrogalvanized steel, hot dipped galvanized steel, titanium and alloys; plastics can include but are not limited to TPO, SMC, TPU, polypropylene, polycarbonate, polyethylene, and polyamides (Nylon). The substrates can be primed metal and/or plastic; that is, an organic or inorganic layer is applied thereto. Further, the coating composition of the present invention can be applied to said substrates to impart one or more of a wide variety of properties such as but not limited to corrosion resistance, abrasion resistance, impact damage, flame and/or heat resistance, chemical resistance, UV light resistance, structural integrity, ballistic mitigation, blast mitigation, sound dampening, decoration and the like. As used herein, "ballistic mitigation" refers to reducing or alleviating the effects of a bullet or other type of firearm ammunition. As used herein, "blast mitigation" refers to reducing or alleviating the secondary effects of a blast. In non-limiting examples, the coating composition of the present invention can be applied to at least a portion of a building structure or an article of manufacture such as but not limited to a vehicle. "Vehicle" includes but is not limited to civilian, commercial, and military land-, water-, and air-vehicles, for example, cars, trucks, boats, ships, submarines, airplanes, helicopters, humvees and tanks. The article of manufacture can be a building structure. "Building structure" includes but is not limited to at least a portion of a structure including residential, commercial and military structures, for example, roofs, floors, support beams, walls and the like. "Building structure" also includes structures, including those that define apertures, associated with mining. Typical mine structures include mains, submains, gate road entries, production panels, bleeders, and other active working areas associated with underground mining. Accordingly, the present compositions can also be used to coat mine supports, beams, seals, stoppings, ribs, exposed strata, and the like and can be further used, alone or in conjunction with other layers, to seal and/or reinforce mine structures. As used herein, the term "substrate" may refer to a surface, either external or internal, on at least a portion of an article of manufacture or the article of manufacture itself. In an embodiment, the substrate is a truck bed.

In certain embodiments, the substrate can comprise a footwear component and the article of manufacture is footwear or a shoe. Accordingly, the present invention is further directed to footwear comprising polyurea. More specifically, one or more components of the footwear can comprise a polyurea coating, and/or a polyurea in the material used to form the component itself. The polyurea can be the polyurea described above or any other polyurea known in the art.

As used herein, the terms "footwear" and "shoe" include athletic and sport shoes, men's and women's dress shoes, men's and women's casual shoes, children's shoes, sandals, flip flops, boots, work boots, outdoor footwear, orthopedic shoes, slippers and the like. The term "footwear component" includes any component of a shoe including the outsole, midsole, polymeric bladder, upper materials and shoe liners. It will be appreciated that these components are made from a number of different materials or substrates. In certain embodiments, the footwear component coated according to the present invention forms all or part of a shoe upper. A particularly suitable portion of the upper coated according to the present invention is the toe. The "toe" will be understood as referring to the front portion of the shoe, which typically experiences a relatively high level of wear and/or abrasion. It has been surprisingly discovered that coating this portion of the shoe with a composition comprising polyurea results in improved resistance to wear and/or abrasion.

In another embodiment, the coated component comprises a polymeric bladder. The polymeric bladder can be filled, for example, with plasma, water, or other fluid, such as gases, including air, nitrogen and the like. Such bladders are known in the footwear industry, and are described, for example, in U.S. Pat. Nos. 6,944,973; 6,119,371; 5,713,141; 5,952,065; 5,353,459; 4,506,460; and 4,219,945, all of which are incorporated in pertinent part by reference herein. It has been surprisingly discovered that coating the polymeric bladder with a composition comprising polyurea results in a bladder that has improved puncture resistance against, for example, sharp objects such as thorns, rocks, metal objects, glass objects, etc.; these items are known to puncture footwear bladders.

In certain embodiments, the polymeric bladder is contained within a midsole, and it is the midsole that is coated at least in part with a composition comprising polyurea. For example, the polyurea composition can be applied to the underside of a midsole containing a nitrogen-filled polymeric bladder to protect the bladder against puncture failure. In other embodiments, the polymeric bladder is contained within the outsole.

The coating comprising polyurea used according to the present invention to coat footwear and/or a footwear component can be any polyurea coating known in the art. It will be appreciated that polyureas are generally formed by reacting an amine component and an isocyanate component. Any amine and/or isocyanate known in the art can be used, including any of those described above, and/or any of those described in United States Publication Numbers 2006/046068 A1, 2007/0160851 A1, 2007/0160853 A1 and 2008/0160318 A1 and U.S. patent application Ser. Nos. 11/460,439; 11/591,312; 11/611,982; 12/122,980; 12/122,972; 12/122,983; 61/099,752 and 11/773,051, all of which are hereby incorporated by reference in their entirety. In certain embodiments, the polyurea is formed from a reaction mixture comprising a first component comprising an isocyanate, said first component having a viscosity of ≤2000 centipoise at a temperature ≥7° C. and a second component comprising an amine having a viscosity of ≤1700 centipoise at a temperature ≥7° C. Any additional ingredients as described above can also be used in either or both of the components.

In an embodiment, the coating composition of the present invention may be applied to a carrier film, or used as a two coat application resulting in a textured surface, which are described in Paragraphs [0041]-[0046] and [0047]-[0049] of U.S. patent application Ser. No. 11/460,439, which paragraphs are incorporated by reference herein. In some embodiments, the carrier film may have a thickness of up to 1 inch. In certain embodiments, the flex modulus of the carrier film can be ≤1500 mPA, such as ≤1400 mPA, as measured by ASTM-412.

In certain embodiments, the coating composition of the present invention may be applied to a bare (e.g., untreated, uncoated) substrate, a pretreated substrate and/or coated substrate having at least one other coating. In an embodiment, the coating composition of the present invention may be applied to a multi-layer coating composite. The first coating applied to a substrate may be selected from a variety of coating compositions known in the art for surface coating substrates. Non-limiting examples may include but are not limited to electrodepositable film-forming compositions, primer compositions, pigmented or non-pigmented monocoat compositions, pigmented or non-pigmented base coat compositions, transparent topcoat compositions, industrial coating compositions, and the like. In another non-limiting embodiment, the coating composition of the present invention may be applied to a multi-layer coating composite comprising a pretreated substrate and coating layers such as but not limited to electrocoat, primer, base coat, clear coat, and combinations thereof. In other embodiments, the coating of the present invention may be used in conjunction with any of the coating layers described above and/or another polyurea and/or polyurea/polyurethane coating. The coating layers may comprise the same or different polyurea or polyurea/polyurethane coating compositions. For example, the first layer may be a polyurea composition comprising aliphatic and/or aromatic amine components and/or aliphatic and/or aromatic isocyanate; and the second layer may comprise the same or different combination of aliphatic and/or aromatic amine components and/or aliphatic and/or aromatic isocyanate. In another embodiment, the outermost coating layer may comprise a coating composition that provides a desired durability. The desired durability may depend upon the use of the coating composition of the present invention and/or the substrate to which it may be applied. In an embodiment, a combination of aliphatic and/or aromatic amine and/or isocyanate may be selected such that the composition of the outermost layer has substantial durability. For example, the outermost coating layer may have a durability of from 1000 kJ to 6000 kJ, or from 800 hours to 4000 hours, when tested using a Weatherometer (Atlas Material Testing Solutions) in accordance with method SAE J1960. In this embodiment, the first layer may be a polyurea composition comprising isocyanate and amine, wherein at least one of the amine and/or polyisocyanate may be aromatic, and the second layer may be a polyurea composition comprising aliphatic amine and aliphatic isocyanate. In some embodiments, a flame retardant coating composition, such as a water based latex flame retardant coating composition, may be applied onto the cured polyurea coating composition disclosed herein. For example, in certain embodiments SPEEDHIDE 42-7 (commercially available from PPG Industries, Inc.) may be applied onto the polyurea coating composition. In other embodiments, a Chemical Agent Resistant Coating (CARC), which are known in the art, may be applied over at least a portion of the polyurea to enhance its flame resistance.

The footwear components coated at least in part according the present invention can be uncoated, or can have been previously coated with another coating or coatings. It might be desirable to select polyurea coatings that will be compatible with the previous coating(s). In certain embodiments, whether the component is coated or not, it may be desirable to add an adhesion promoter to the polymer coating. In other embodiments, it may be desirable to apply an adhesion promoter directly to the footwear component prior to application of the polyurea coating. In yet other embodiments, it may be desirable to wipe the footwear component with a solvent prior to application of the polyurea coating; suitable solvents include those that will be innocuous to the substrate being coated, such as acetone, MEK, isopropanol and the like. In still other embodiments, particularly when the footwear component comprises foam, it may be desirable to dip the component in powder prior to application of the polyurea coating, such as is described in U.S. patent application Ser. No. 11/448,627, incorporated by reference in its entirety herein.

In further embodiments, the present invention is directed to footwear comprising a component that comprises polyurea. In these embodiments, rather than (or in addition to) having a polyurea coating on the component, the polyurea actually forms part of the material that makes up the component. A typical shoe component that would fall within this embodiment is a shoe outsole, although the invention is not so limited.

Any of the compositions comprising polyurea described above can be used to form footwear components. Typically, the compositions that comprise polyurea will further comprise some sort of particulate filler. The particulate filler can be any organic or inorganic filler such as those used in the formation, for example, of rubber products, such as typical shoe outsoles, tires and the like. These fillers are sometimes referred to as a "reinforcing filler" in the art. A typical reinforcing filler is silica. Any suitable hydrophilic or hydrophobic silica can be used, such as highly dispersible precipitated silicas, which will be understood by those skilled in the art as referring to those silicas having a substantial ability to disagglomerate and to disperse in a matrix. Silicas are widely commercially available, such as from PPG Industries, Inc. Another suitable reinforcing filler includes carbon black. Still other fillers include, for example, metal oxides and carbides including alumina and boron carbide, clay (natural and synthetic), mica (natural and synthetic), fiberglass, inorganic metal powder, talc, calcium sulfate, calcium silicate, organic fibers, polymer fibers, and polymer particles.

The filler can be in any form, such as powder, microbeads, granules, balls, particles, or fibers. The size of the filler can range, for example, from 0.01 microns to 1000 microns. Particulate fillers may be used to influence the physical and/or mechanical properties of the polyurea, such as the viscosity, modulus, tangent delta, and the like. Footwear comprising a component made using the polyureas described herein with one or more particulate fillers may also have reduced hysteresis, improved traction, and the like. Particulate fillers may also be used to improve the durability and/or wear resistance of the footwear component.

When the polyurea composition used to form a footwear component according to the present invention comprises an inorganic filler, it may further comprise a coupling agent. A coupling agent will be understood as an agent that has a moiety reactive with the surface of the inorganic filler and a moiety that binds to the polyurea or to the components that form the polyurea. The coupling agent can comprise an organisilane, for example, or can comprise a bifunctional silica coupling agent. Coupling agents are widely available commercially, and an appropriate coupling agent can be determined by one skilled in the art based upon the type of filler being used. Suitable coupling agents are described, for example, in U.S. Pat. No. 7,211,611, incorporated by reference in pertinent part herein.

The composition comprising the polyurea can be formulated in any manner. Following formulation, a shoe component, such as an outsole, can be formed from the polyurea composition by a number of methods. This includes, for example, spray application to another shoe component, such as a midsole, casting a sheet of the polyurea formulation and post-processing the sheet to a desired shape and form, casting the polyurea formulation in a mold, spraying the polyurea formulation into a mold, or injection-molding the component. The use of any of the polyurea compositions described herein, particularly in conjunction with one or more fillers, in the production of shoe components provides ease of manufacturing as compared with conventional methods for making compounded natural and/or synthetic rubber. Moreover, a shoe component, such as an outsole, prepared as described herein, will typically provide good traction to the user, particularly in wet conditions such as rain or snow. The component will also typically exhibit enhanced wear and/or abrasion resistance as compared with a typical natural and/or synthetic rubber outsole. Finally, the puncture resistance of the components is enhanced as compared with footwear components currently available. This is particularly relevant when the component is or comprises a polymeric bladder that is coated itself with a polyurea composition, is contained within a component that is coated with a polyurea, or is contained within a component that is made from the polyurea.

The wear resistance observed in footwear components according to the present invention is particularly relevant in the tread and other portions of the shoe outsole, but is also particularly relevant in the toe of the shoes, especially shoes used for tennis, where the toe is often dragged during play such as during service. It is often the case that the wearer can abrade the toe such that the aesthetics or even the shoe itself are impaired and ultimately such that a hole can be worn through the toe.

The coating of the present invention or used according to the present invention may be applied to a dry film thickness ranging from 20 to 1000 mils, or from 40 to 150 mils, or from 60 to 100 mils (1524-2540 microns), or from 500 to 750 mils. It will be appreciated that these coating layers are relatively "thick". The coating compositions of the present invention can also be applied as much thinner layers as well, such as 0.1 to less than 15 mils, such as 0.1 to 10, 0.5 to 3, or 1 to 2 mils. Any of the endpoints within these ranges can also be combined. Such layers can be used alone or in conjunction with other coating layers, such as any of those known in the art or otherwise described herein. When applied at a sufficient thickness (e.g., 10 to 1000 mils, such as 100 to 200 mils, or 125 mils +/−10 mils), the present polyurea layer(s) can provide blast and/or ballistic mitigation. When applied at a sufficient thickness (e.g. 0.5 to 100 mils), the composition can provide wear resistance, puncture resistance and the like in footwear. It will be appreciated that the thickness of the composition needed to impart an appropriate level of puncture resistance may be higher than that needed to impart an appropriate level of wear resistance. The appropriate thickness can be determined based upon the needs of the user.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLE 1

A modified polyphosphate diol was prepared from the following ingredients:

| Ingredient | Amt in grams |
| --- | --- |
| EXOLIT OP 550 (LV)[1] | 233.4 |
| p-toluene sulfonic acid | 3.6 |
| CARDURA E-10P[2] | 130.1 |

[1]Polyphosphate diol available from Clariant Corporation.
[2]Neodecanoic acid glycidyl ester available from Resolution Performance Products LLC.

The above ingredients were charged to a suitable reactor equipped with a heating mantle, reflux condenser, overhead stirrer, thermocouple, and $N_2$ inlet. A $N_2$ blanket was applied to the reactor and the mixture heated in 10° C. increments over two hours to 140° C. The reaction mixture was held at this temperature and sampled for epoxy equivalent weight approximately every 4 hours. After 13.25 hours, the epoxy equivalent weight was determined to be infinite (no end point in titration) and the reaction was judged to be complete. The resulting resin was a clear, viscous fluid and was found to have a measured solids (110° C., 1 hr) of 88.4 percent, a viscosity of Z2—on the Gardner-Holt scale, an acid value of 2.7 mg KOH/g, a hydroxyl value of 82.2 mg KOH/g, and a $M_w$ of 1126, a $M_n$ of 553, a $M_z$ of 1866, and a peak molecular weight of 620 as determined by gel permeation chromatography versus a polystyrene standard.

EXAMPLE 2

A substantially compatible isocyanate component comprising a phosphorus-containing isocyanate-functional prepolymer was prepared from the following ingredients as described below:

| Ingredients | Parts by Weight (grams) |
| --- | --- |
| DESMODUR XP2580[3] | 7537 |
| RESIN FROM EXAMPLE 1 | 338 |
| Dibutyltin dilaurate[4] | 0.14 |
| FYROL PCF[5] | 871 |

[3]Polyisocyanate available from Bayer Material Science Corporation.
[4]Available from Elementis Specialties.
[5]tris (2-chloroisopropyl) phosphate flame retardant available from Supresta.

A total of 7537 grams of DESMODUR XP2580 was placed in a suitable reaction vessel equipped with a stirrer, temperature probe, a condenser and a nitrogen inlet tube and blanketed with nitrogen gas. A total of 338 grams of RESIN FROM EXAMPLE A and 875 grams of FYROL PCF was then added and mixed for 15 minutes at ambient temperature. Then, 0.14 grams of dibutyltin dilaurate was added and the mixture was heated slowly to 50° C., then to 80° C. and finally to 100° C. The contents of the reactor were cooled and the isocyanate equivalent weight of the resin was measured and found to be 253 grams per equivalent. A total of 307 grams of XP2580 was then added to the contents of the flask, mixed well and the contents of the reactor were poured out. The final material was a clear, compatible resin with a measured solids of 99% and an isocyanate equivalent weight of 250 grams per equivalent.

EXAMPLE 3

A grind paste for the amine component was prepared from the following ingredients as described below:

| Ingredient | wt. in parts |
| --- | --- |
| JEFFLINK 754[6] | 25.61 |
| DESMOPHEN NH1220[7] | 31.04 |
| JEFFAMINE D2000[8] | 24.74 |
| AEROSIL R812[9] | 9.31 |
| BENTONE 34[10] | 3.1 |
| TIPURE R960-09[11] | 6.2 |
| Total | 100 |

[6]Secondary diamine available from Huntsman Corp.
[7]Aspartic ester amine available from Bayer Material Science Corporation
[8]Primary diamine available from Huntsman Corp.
[9]Available from Degussa fumed silica.
[10]Available from Elementis Specialties clay.
[11]Available from DuPont $TiO_2$.

The ingredients were combined and charged to a Premier Mill HM 1.5 VSD Series SuperMill (SPX Corporation) with an 85 percent charge of 1.0 mm Mill Mates Plus TZP grind medium (Zircoa, Inc.) and ground at a mill speed of 2400 rpm. The grinds were judged to be complete when the particle size was found to be 7.5 Hegman upon drawdown on a fineness of grind gauge.

EXAMPLE 4

An amine component was prepared from the following ingredients as described below:

| Ingredient | wt. in parts |
| --- | --- |
| Grind Paste OF Example 3 | 64.4 |
| DESMOPHEN NH1220 | 10 |
| JEFFAMINE D2000 | 19.1 |
| JEFFLINK 754 | 6 |
| Dibutylin dilaurate | 0.5 |
| Total | 100 |

The ingredients listed in the table above were then added together at ambient conditions.

INVENTION AND COMPARATIVE EXAMPLES

Polyurea coating composition of the invention (Examples 4 and 2 in Table 1 below) were prepared by combining an isocyanate functional "A" side component and an amine functional "B" side component in the following manner: Polyurea coating compositions were produced by mixing a 1:1 volume ratio of each of the A-side components to each the B-side components in a static mix tube applicator device available from Plas-Pak Industries, Inc. The coating compositions were applied by spraying to 6"×18" panels of a calcium silicate fiber reinforced autoclaved building sheet containing fibers of natural origin (available under the designation Tunnel Board Z from Taylored Industries, Indianola, Pa.) at a film thickness of 70 to 90 mils. Tack times for the coatings were determined by periodically touching the panel with a gloved hand and were judged to be tack free when the glove no longer stuck to the coatings. In all cases the coatings were tack free in <2 minutes. The one comparative example (Examples BDL1724S and CAT128 in Table 1 below) were also applied in the manner described above except the "A" and "B" side components were heated to 60° C. prior to spraying. In these examples, the isocyanate "A" side component was CAT-128 (available from PPG Industries, Inc.) and the amine functional "B" side component was BDL-1742S (available from PPG Industries, Inc.).

Viscosity measurements on the invention and comparative examples were determined using a PHYSICA MCR 301 Rheometer (commercially available from Antone Paar GmbH, Austria) having a 50 mm/1° cone plate. The sample that is to be measured is loaded onto the cone plate at 23.89° C. and viscosity measurements are taken at a constant shear rate of 1000 s$^{-1}$ at the appropriate temperatures.

TABLE 1

| Examples | Description | 7.22° C. (cP) | 10.00° C. (cP) | 12.78° C. (cP) |
|---|---|---|---|---|
| BDL1724S (comparative) | Amine | 763 | 639 | 516 |
| 4 | Amine | 906 | 758 | 612 |
| CAT128 (comparative) | Isocyanate used with BDL1724S | 12,100 | 9,480 | 7,100 |
| 2 | Isocyanate used with 4 | 1,890 | 1,570 | 1,260 |

As can be seen from Table 1, the viscosities of isocyanate component (Example 2) of the present invention is significantly less thereby allowing the isocyanate component of the present invention to be spray applied onto a substrate without having to heat the component prior to spray application.

EXAMPLE 5

An amine component was prepared from the following ingredients as described below:

| Ingredient | Wt. in Parts |
|---|---|
| Grind Paste of Example 3 | 64.4 |
| DESMOPHEN NH1220 | 10.0 |
| JEFFAMINE D2000 | 9.1 |
| JEFFLINK 754 | 6.0 |
| ETHACURE 90[12] | 10 |
| Dibutyltin dilaurate | 0.5 |
| Total | 100 |

[12] Aliphatic secondary diamine available from Albemarle.

The ingredients listed in the table above were then added together at ambient conditions.

EXAMPLES 6 and 7

Polyurea coating compositions of the invention (Examples 6 and 7 in Table 2) were prepared from combining an isocyanate functional "A" side component and an amine functional "B" side component in following manner: The polyurea coating compositions were produced by mixing a 1:1 volume ratio of each of the A-side components to each the B-side components in a static mix tube applicator device available from Plas-Pak Industries, Inc. The coating compositions were applied by spraying approximately 20 mils on a TPU foam substrate at ambient conditions. The crosshatch adhesion according to ASTM D3359-08 of Examples 6 and 7 to the TPU foam substrate was excellent after 24 hours aging at ambient conditions.

TABLE 2

| Examples | Isocyanate "A" component | Amine "B" component | Cross-hatch Tape Adhesion |
|---|---|---|---|
| 6 | Example 2 | Example 4 | Excellent |
| 7 | DESMODUR XP-2580 (available from Bayer Material Science) | Example 5 | Excellent |

What is claimed is:

1. A coating composition comprising a polyurea formed from a reaction mixture comprising: (a) a first component comprising an isocyanate, said first component having a viscosity of 2000 centipoise at a temperature >7° C., wherein said isocyanate comprises an isocyanate functional prepolymer formed from a reaction mixture comprising an isocyanate and a material comprising a phosphorus-containing polyol; and (b) a second component comprising an amine, wherein said second component has a viscosity of 1700 centipoise at a temperature >7° C., wherein said amine is selected from the group consisting of cycloaliphatic amines, linear aliphatic amines, aliphatic polyetheramines, aromatic amines and aspartic ester amines;
   wherein the phosphorus-containing polyol is the reaction product of an initial phosphorous-containing polyol and the epoxy functional compound comprises neodecanoic acid glycidyl ester.

2. The coating composition according to claim 1, wherein said second component has a viscosity of ≤1000 centipoise at a temperature ≥7° C.

3. The coating composition of claim 1, wherein the phosphorus-containing polyol is the reaction product of a phosphorus-containing acid, an epoxy functional compound, and, optionally, an initial phosphorus-containing polyol.

4. A method for coating a substrate comprising applying to at least a portion of the substrate the coating of claim 1.

5. A substrate coated at least in part with the coating composition of claim 1.

6. The substrate of claim 5, wherein the substrate comprises footwear.

7. Footwear comprising a component that is coated at least in part with the coating composition of claim 1.

8. The footwear of claim 7, wherein the component comprises a footwear upper component.

9. The footwear of claim 8, wherein the upper component comprises a toe component.

10. The footwear of claim 7, wherein the component comprises a polymeric bladder.

11. The footwear of claim 7, wherein the composition comprising polyurea further comprises an adhesion promoter.

12. The footwear of claim 7, wherein the composition comprising polyurea further comprises polyurethane.

13. Footwear comprising a component that comprises the coating composition of claim 1.

14. The footwear of claim 13, wherein the component comprises a midsole.

15. The footwear of claim 13, wherein the component comprises an outsole.

16. The footwear of claim 13, wherein the component further comprises a reinforcing filler.

17. The footwear of claim 16, wherein the filler is an inorganic filler.

* * * * *